July 4, 1933.  R. O. AYRES ET AL  1,916,598
RETURN BEND
Filed May 31, 1930  3 Sheets-Sheet 1

Inventors
Robert O. Ayres
Frederick A. Kroll
Edwin A. Johnson
Hardway Cather
Attorneys

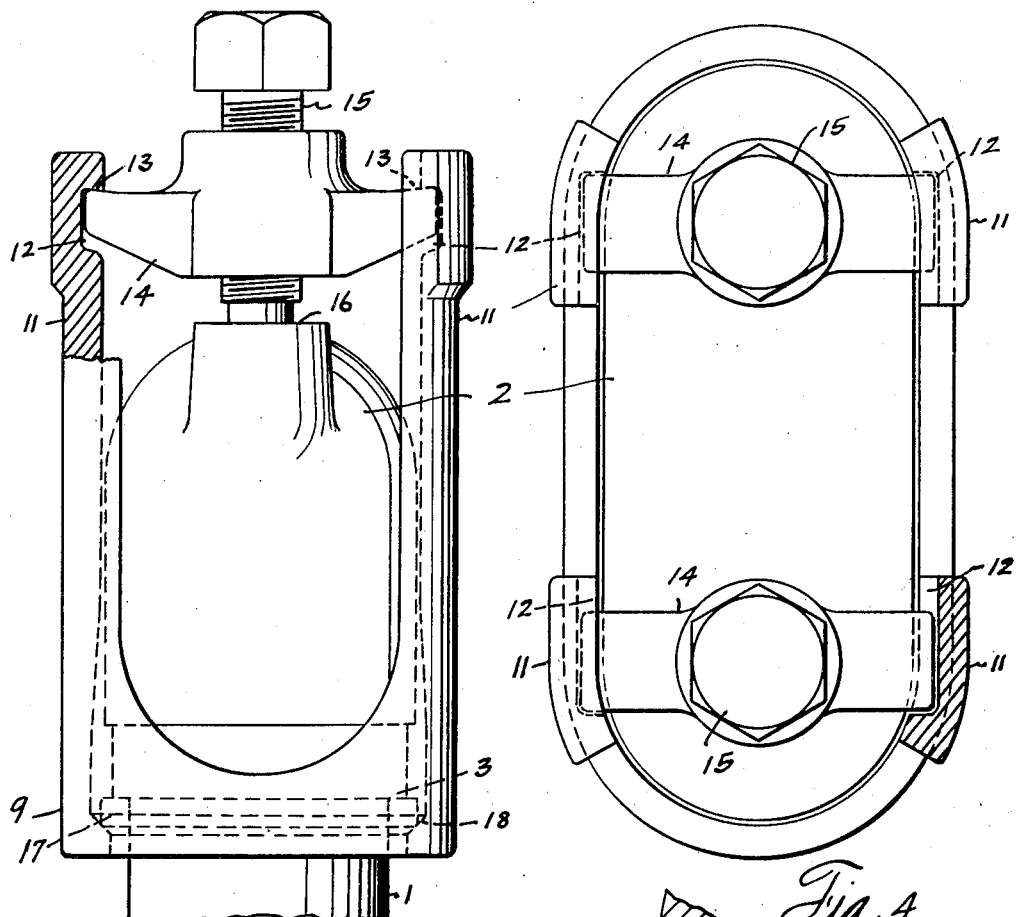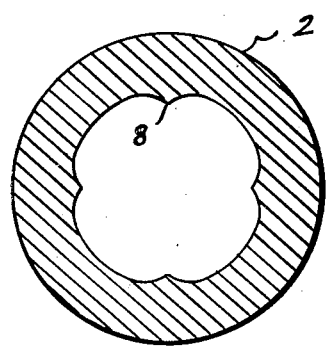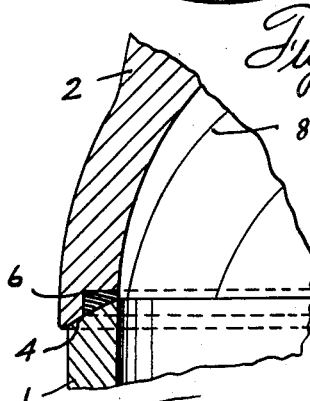

July 4, 1933.  R. O. AYRES ET AL  1,916,598
RETURN BEND
Filed May 31, 1930   3 Sheets-Sheet 3

Inventors
Robert O. Ayres
Frederick A. Kroll
Edwin A. Johnson
By Hardway & Cathey
Attorneys Patented July 4, 1933

1,916,598

UNITED STATES PATENT OFFICE

ROBERT O. AYRES, FREDERICK A. KROLL, AND EDWIN A. JOHNSON, OF HOUSTON, TEXAS; SAID JOHNSON ASSIGNOR TO J. H. McEVOY AND COMPANY, OF HOUSTON, TEXAS, A CORPORATION OF TEXAS

RETURN BEND

Application filed May 31, 1930. Serial No. 457,838.

This invention relates to new and useful improvements in a return bend.

One object of the invention is to provide a novel type of return bend for connecting the corresponding ends of tubes or other conduits, the ends of the return bend and the abutting ends of said tubes being provided with abutting parts so shaped as to insure close fitting joints irrespective of variations in the lengths of the connected tubes.

Another object of the invention is to provide a return bend which is internally rifled for the purpose of inducing a scouring action on the part of the conducted fluid to reduce the coking of the oil against the hot tube, and thereby reducing the necessity of cleansing the return bend, as well as for securing a more efficient heat transfer.

A further feature of the invention resides in a novel means for securing the return bend in place in relation to the tubes to be connected thereby whereby the return bend may be quickly installed or dismantled from the tubes and securely retained in place with the joints between the tubes and return bend maintained with a close fit to prevent leakage.

The type of return bend and means for securing the same in relation with the tubes to be connected thereby are particularly designed for use in connection with oil refining stills but are capable of general use.

With the above and other objects in view, this invention has particular relation to certain novel features of construction, arrangement of parts and use, an example of which is given in this specification, and illustrated in the accompanying drawings, wherein:

Figure 3 shows a side elevation, partly in section, taken at right angles to that shown in Figure 1.

Figure 4 shows an end view, partly in section.

Figure 5 shows a cross sectional view taken on the line 5—5 of Figure 1.

Figure 6 shows a fragmentary sectional view through the joint, showing a modified form of said invention.

Figure 1:
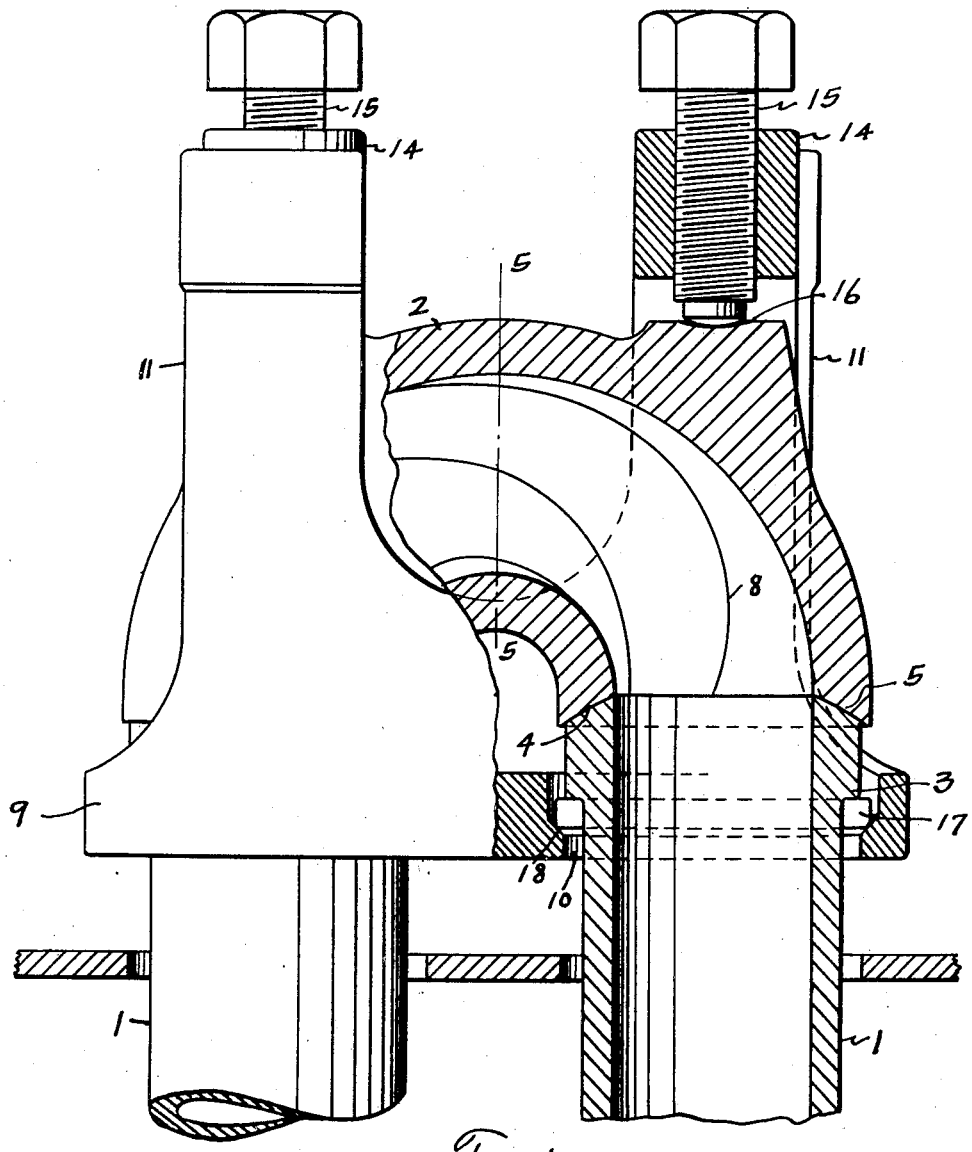
Figure 1 shows a side elevation of the return bend, the connected tubes and the means for securing these parts together, shown partially in section.
Figure 2:
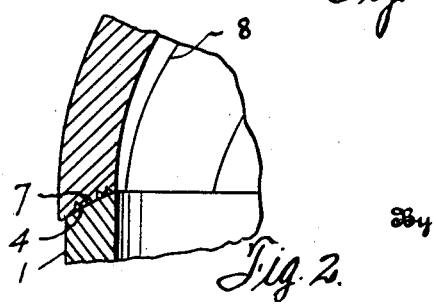
Figure 2 shows a fragmentary sectional view of a modified form of the joint, which may be employed.

Referring now more particularly to the drawings wherein like numerals of reference designate similar parts in each of the figures, the numerals 1, 1 designate the tubes to be connected and the numeral 2 designates the return bend as a whole. The connected ends of the tubes are upset forming the external, annular shoulders 3 and the free end of each tube is rounded off, forming an annular face 4 which is convex forming an annular spherical segment, of a sphere of any selected radius which may be varied within wide limits. The respective ends of the return bend are formed with the corresponding convex annular faces 5 shaped to conform to and closely fit against the opposing convex faces 4, of the respective tubes 1, 1 to be connected. These tubes vary somewhat in length, thus causing an angular variation between the return bend and the adjacent end of the corresponding tube but the ball and socket joint formation described permits this variation and still maintains a tight fitting joint. This may be a ground joint or the joint may be provided with a metallic, or heat-resisting, non-metallic packing as 6, or one of said faces 4, 5 may be provided with annular grooves as 7 to lessen the contacting area of the faces and to thus insure a tighter fit between said opposing faces. The return bend is preferably, though not necessarily, provided with the internal rifles or spiraled ribs 8 to the end that a scouring action of the fluid passing through said return bend will be induced to prevent the coking of the oil against the hot tube thus conducing to a better heat transfer and reducing the necessity of cleaning the return bend.

There is a clamp member 9 having suitable bearings 10 through which the upset ends of the tubes 1 are fitted and this clamp member is provided with the pairs of outstanding arms 11, 11 the arms of each pair embracing the return bend 2, as shown. The outer ends of these arms have the facing recesses 12, 12 providing the outside shoulders 13, 13 and cross yokes 14, 14 are provided, one between the arms of each pair, the ends of these cross yokes fitting into the corresponding recesses 12 and being adapted to bear against the opposing shoulders 13. The jack screws 15, 15 are threaded through central tapped holes in the respective yokes and their inner ends bear against the external bearing faces 16, 16 of the return bend, one on each side. By tightening up on said jack-screws the return bend may be anchored securely in place with the opposing bearing faces of said return bend and the respective tubes forming close fitting joints. In order to anchor the clamp 9 to the corresponding ends of the tubes, a split ring as 17 is interposed between the shoulders 3 and the opposing angular bearing face 18 formed in the bearings 10 of the clamp member 9. These faces 18 bear such angular relation to the split rings 7 that their outer angles or corners will rest against said opposing faces 18. These split rings form in effect interlocking keys between the clamp member 9 and the corresponding ends of the tubes 1 and said rings may be of various dimensions to provide for variations in the distance between the shoulder 3 and the opposing face 18, due to variations in the lengths of the tubes 1, or in the distances of the shoulders 3 from the corresponding end of the tubes.

The recesses 12 extend inwardly to the inner margins of the respective arms 11 as clearly shown in Figure 4 to facilitate the insertion of the ends of the yokes 13 into said recesses.

The assembly may be made up in an obvious manner by applying the clamp 9 over the ends of the tubes 1 and securing the same in place by inserting the keys or split rings 17 and then fitting the return bend to the ends of the tubes to be connected and inserting the yokes in position and tightening up on the jack screws 15 and by a reverse operation the return bend may be readily removed for cleaning, repairs or replacement.

Figures 7, 8:
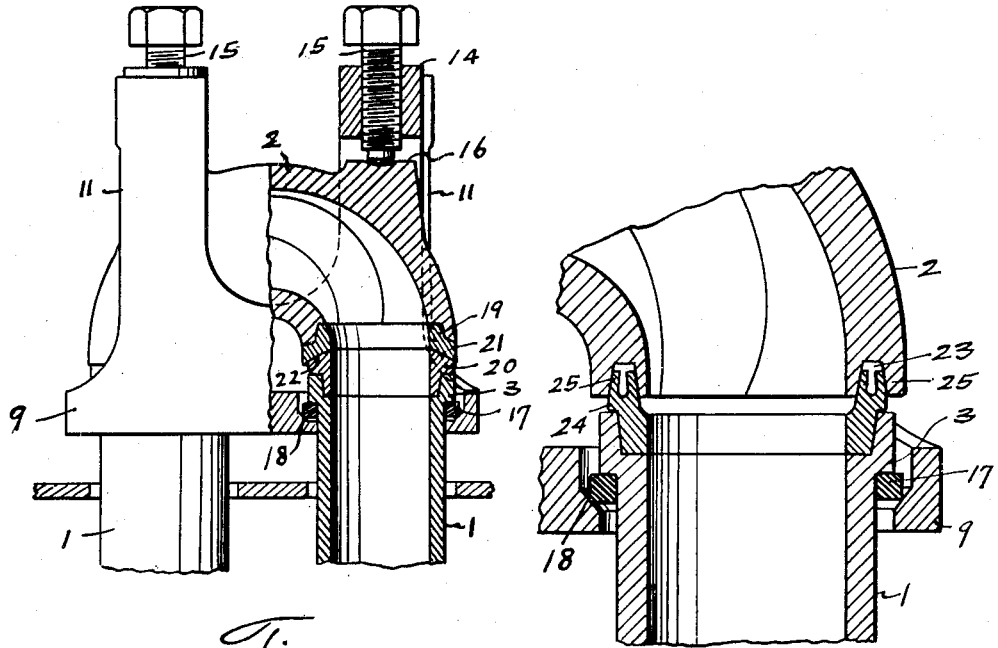
Figure 7 shows a similar view to that shown in Figure 1, but showing another form of joint between the return bend and connected tubes.
Figures 8 and 9 show fragmentary sectional views illustrating still other forms of joint.

In Figure 7 there is shown a modification of the joint between the end of the return bend and the adjacent end of a tube wherein there is shown tubular inserts, as 19, 20 driven, or otherwise secured, in the adjacent ends of said parts. One of these inserts may be provided with a concaved, annular face 21, and the other with a corresponding convex, annular face 22, said faces 21 and 22 fitting closely together when the parts are assembled. One only of such inserts may be used in accordance with the requirements of the situation, and the length of such insert, or inserts will depend on the variation, in length, of the tube.

Figure 9:
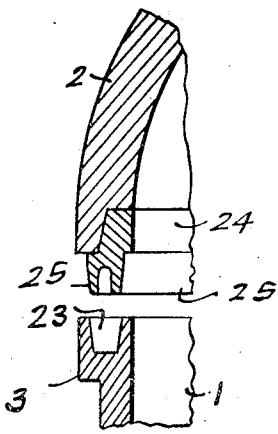

In Figures 8, and 9, other modifications of the joint are shown, wherein the abutting ends of the return bend and tubes are provided, one with an annular tapering groove 23 and the other with a detachable, tubular insert 24, driven, or otherwise secured, therein. The free end of this insert 24 is annularly grooved providing the annular lips 25, 25 which when fitted into the opposing groove 23 will yield so as to conform to the taper thereof and form a close fitting joint therein. The length of the insert 24 may be varied to correspond to the variation, in length, of the corresponding tube.

The drawings and description disclose what is now considered to be preferred forms of the invention by way of illustration only, while the broad principle of the invention will be defined by the appended claims.

What we claim is:—

1. The combination with a return bend, of tubes whose adjacent ends are connected by said return bend, said connected ends each having an external shoulder, a bracket having openings through which said ends of said tubes extend, each opening having an annular face inclined to the axis of the corresponding tube, an annular key between each shoulder and said corresponding face and having an annular outer edge which bears against said face, said key being movable on said face and serving to interlock said bracket with said tubes, means connected to the bracket and bearing against said return bend and effective to maintain said return bend in assembled relation with said tubes.

2. The combination with a return bend, of tubes whose adjacent ends are connected by said return bend, said connected ends each having an external shoulder, a bracket having openings through which said ends of said tubes extend, each opening having an annular face inclined to the axis of the corresponding tube, an annular key between each shoulder and said corresponding face and having an annular bearing face narrower than, and working against, the bearing face of the opening, said key being adjustable into varying angular bushing relative to said face of said opening and serving to interlock said bracket with said tubes, means connected to the bracket and bearing against said return bend and effective to maintain said return bend in assembled relation with said tubes, said means comprising spaced arms, yokes detachably connected with the arms and jack screws threaded through the yokes and bearing against said return bend.

3. The combination with a pair of tubes having external shoulders thereon, of a return bend, a bracket whose ends encircle said tubes and are provided with tapering, annular faces which surround the tubes, annular keys around the tubes between said shoulders and their corresponding faces, said keys having annular faces narrower than, and adjustable into varying angular relations relative to, and bearing against, said bracket faces, and means on the bracket for maintaining the return bend in assembled relation with the tubes.

In testimony whereof we have signed our names to this specification.

ROBERT O. AYRES.
EDWIN A. JOHNSON.
FREDERICK A. KROLL.